(12) United States Patent
Fujita et al.

(10) Patent No.: US 10,919,276 B2
(45) Date of Patent: Feb. 16, 2021

(54) ADHESIVE RESIN LAYER, ADHESIVE RESIN FILM, LAMINATE, AND METHOD OF PRODUCING LAMINATE

(71) Applicant: FUJIMORI KOGYO CO., LTD., Tokyo (JP)

(72) Inventors: Shiro Fujita, Tokyo (JP); Atsushi Suzuki, Tokyo (JP); Hiroto Niimi, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 185 days.

(21) Appl. No.: 15/540,098

(22) PCT Filed: Jan. 27, 2016

(86) PCT No.: PCT/IB2016/000054
§ 371 (c)(1),
(2) Date: Jun. 27, 2017

(87) PCT Pub. No.: WO2016/120710
PCT Pub. Date: Aug. 4, 2016

(65) Prior Publication Data
US 2017/0368808 A1    Dec. 28, 2017

(30) Foreign Application Priority Data
Jan. 30, 2015  (JP) .............................. JP2015-017131

(51) Int. Cl.
*B32B 7/02* (2019.01)
*B32B 27/30* (2006.01)
(Continued)

(52) U.S. Cl.
CPC .............. *B32B 27/308* (2013.01); *B32B 7/12* (2013.01); *B32B 17/064* (2013.01); *B32B 37/06* (2013.01);
(Continued)

(58) Field of Classification Search
CPC ... B32B 27/308; C09J 133/066; C09J 133/00; C09J 133/02; C09J 133/04; C09J 133/06;
(Continued)

(56) References Cited

U.S. PATENT DOCUMENTS

2011/0205469 A1    8/2011  Ha et al.
2012/0156456 A1    6/2012  Niimi et al.
(Continued)

FOREIGN PATENT DOCUMENTS

EP        2226371 A2      9/2010
JP     2011-509332 A      3/2011
(Continued)

OTHER PUBLICATIONS

Machine Translation of JP 2013-221065 (Year: 2013).*
(Continued)

*Primary Examiner* — Maria V Ewald
*Assistant Examiner* — Zachary M Davis
(74) *Attorney, Agent, or Firm* — Hauptman Ham, LLP

(57) ABSTRACT

The present invention provides an adhesive resin layer, which can prevent generation of air bubbles even when adhered to a substrate having a high level difference, and can maintain transparency, an adhesive resin film, a laminate, and a method of producing a laminate. More specifically, the present invention is a monolayered adhesive resin layer comprising an acrylic-based adhesive resin composition having transparency, wherein the adhesive resin composition contains an acrylic-based polymer, an acrylic-based monomer, and a thermopolymerization initiator, and an adhesive resin layer has pressure sensitive adhesiveness on both surfaces at an ambient temperature, and can be thermally cured by heating at a temperature of 100 to 250° C. and a time of 30 seconds to 10 minutes.

12 Claims, 2 Drawing Sheets

(51) Int. Cl.
*C09J 133/00* (2006.01)
*B32B 17/06* (2006.01)
*C09J 133/08* (2006.01)
*C09J 4/06* (2006.01)
*C09J 7/10* (2018.01)
*B32B 7/12* (2006.01)
*B32B 37/06* (2006.01)
*B32B 37/12* (2006.01)
*C08K 5/14* (2006.01)

(52) U.S. Cl.
CPC ............... *B32B 37/12* (2013.01); *C09J 4/06* (2013.01); *C09J 7/10* (2018.01); *C09J 133/00* (2013.01); *C09J 133/08* (2013.01); *C08K 5/14* (2013.01); *C09J 2203/318* (2013.01); *C09J 2203/326* (2013.01); *C09J 2301/312* (2020.08); *C09J 2301/408* (2020.08); *C09J 2433/00* (2013.01)

(58) Field of Classification Search
CPC ...... C09J 133/08; C09J 133/10; C09J 133/12; C08L 33/00; C08L 33/02; C08L 33/04; C08L 33/06; C08L 33/066; C08L 33/08; C08L 33/10; C08L 33/12
See application file for complete search history.

(56) References Cited

U.S. PATENT DOCUMENTS

| | | | |
|---|---|---|---|
| 2014/0030492 A1 | 1/2014 | Kikuchi | |
| 2016/0060490 A1 | 3/2016 | Uchida et al. | |
| 2017/0368808 A1 | 12/2017 | Fujita et al. | |

FOREIGN PATENT DOCUMENTS

| | | | |
|---|---|---|---|
| JP | 2011-162659 A | 8/2011 | |
| JP | 2011-184557 A | 9/2011 | |
| JP | 2012-35431 A | 2/2012 | |
| JP | 2013-1769 A | 1/2013 | |
| JP | 2013-166846 A | 8/2013 | |
| JP | 2013-221065 A | 10/2013 | |
| JP | 2013-234322 A | 11/2013 | |
| JP | 2014-26337 A | 2/2014 | |
| JP | 6460525 B2 | 1/2019 | |
| KR | 10-1023837 B1 | 3/2011 | |
| TW | 200948916 A1 | 12/2009 | |
| WO | 2014/162990 A1 | 10/2014 | |

OTHER PUBLICATIONS

Machine translation of JP 2013-234322 (Year: 2013).*
First Final Rejection for Korean Patent Application No. 10-2017-7017681 dated Jan. 21, 2019 and English translation thereof; 5 pages.
Second Final Rejection for Korean Patent Application No. 10-2017-7017681 dated Mar. 20, 2019 and English translation thereof; 6 pages.
Office Action in KR Application No. 10-2017-7017681, dated Jul. 9, 2018, 12pp.
Extended European Search Report for EP Application No. 16742843.2, dated Jul. 12, 2018, 7pp.
Office Action for Korean Patent Application No. 10-2019-7004967 dated May 23, 2019 and English translation thereof; 9 pages.
International Search Report in PCT/IB2016/000054, dated May 24, 2016.
Written Opinion of the International Search Authority dated May 24, 2016 for PCT/IB2016/000054, 11 pages.
Office Action in JP Application No. 2015-017131, dated Sep. 11, 2018, 7pp.
Notice of Allowance in JP Application No. 2015-017131, dated Dec. 4, 2018, 6pp.
Office Action for Taiwanese Patent Application No. 105102308 dated Jul. 4, 2019 and English summary thereof; 10 pgs.
Office Action for Chinese Patent Application No. 201680004541.9 dated Sep. 27, 2019 and English translation thereof; 13 pgs.
Office Action for Chinese Patent Application No. 201680004541.9 dated May 11, 2020 and English translation thereof; 20 pgs.
Notice of Allowance for Korean Patent Application No. 10-2019-7011623 dated Jul. 7, 2020 and English translation thereof; 3 pgs.
Notice of Allowance for Korean Patent Application No. 10-2019-7004967 dated Jan. 10, 2020 and English translation thereof; 2 pgs.
Office Action for Korean Patent Application No. 10-2019-7011623 dated Jan. 29, 2020 and English translation thereof; 11 pgs.
Notice of Allowance for Japanese Patent Application No. 2018-238867 dated Nov. 12, 2018 and English translation thereof; 5 pgs.
Office Action for Korean Patent Application No. 10-2019-7004967 dated Nov. 21, 2019 and English translation thereof; 7 pgs.
Final Office Action for Taiwanese Patent Application No. 105102308 dated Jan. 31, 2020 and English summary thereof; 5 pages.
Office Action for Chinese Patent Application No. 201680004541.9 dated Aug. 28, 2020 and English translation thereof; 29 pages.

* cited by examiner

ADHESIVE RESIN LAYER, ADHESIVE RESIN FILM, LAMINATE, AND METHOD OF PRODUCING LAMINATE

CROSS REFERENCE TO RELATED APPLICATION

This Application is a 371 of PCT/IB2016/000054 filed on Jan. 27, 2016, which, in turn, claimed the priority of Japanese Patent Application No. 2015-017131 which was filed on Jan. 30, 2015, the content of which is incorporated herein by reference.

TECHNICAL FIELD

The present invention relates to an adhesive resin layer which can prevent generation of air bubbles even when adhered to a substrate having a level difference, an adhesive resin film, a laminate, and a method of producing a laminate.

BACKGROUND TECHNOLOGY

In order to laminate and adhere a substrate having transparency or translucency, such as a touch panel, a cellular phone, a display, and a laminated glass, a pressure sensitive adhesive agent is widely used. A surface of the substrate may have a level difference due to a printing layer, a wiring, an electrode, a frame body or the like. When a pressure sensitive adhesive agent is laminated on a substrate having a level difference, if a gap is generated between the level difference and the pressure sensitive adhesive agent, and air bubbles remain, the adhering strength between substrates, and optical properties through the substrate may be reduced.

Patent Document 1 discloses a pressure sensitive adhesive sheet for a protective film in which a hard coat layer, a transparent substrate film, an adhesive layer, a polyester-based film, a pressure sensitive adhesive layer, and a release sheet are laminated in an order, as a pressure sensitive adhesive sheet for a protective film, which is for a film for protecting a panel at a mobile information terminal such as a cellular phone and a touch panel, particularly for a protective film which is suitable for a glass panel, and is excellent in followability to a shape of a panel. However, in this pressure sensitive adhesive sheet for a protective film, a layer configuration is complicated, the cost is high, moreover, the sheet hardly follows a high level difference due to an elastic force of a resin film, and air bubbles are easily generated.

Patent Document 2 describes a pressure sensitive adhesive sheet which is produced by photopolymerizing an acrylic-based resin composition containing a photoradical polymerization initiator on a release sheet, as a pressure sensitive adhesive sheet used in adhesive application or the like of an optical member. Patent Document 2 does not however refer to air bubble prevention to a level difference.

Patent Document 3 describes the following two embodiments, as a method of producing a touch panel without generating air bubbles or the like.

(First Embodiment) A producing method comprising: a step of applying an ultraviolet curing resin or a thermosetting resin on a surface of a touch panel main body on which a printing layer is formed, and forming a resin layer by ultraviolet irradiation or heating; and a step of adhering a surface on which an optical transparent pressure sensitive adhesive sheet is adhered on a cover film, to a surface of a touch panel main body on which a resin layer is formed.

(Second Embodiment) A producing method comprising: a step of coating an ultraviolet curing resin on a surface of a touch panel main body on which a printing layer is formed, a step of placing a cover film on the ultraviolet curing resin; and a step of irradiating an ultraviolet ray thereafter.

In the case of the first embodiment, it is however necessary that a resin layer is formed for every substrate, respectively, and the number of steps is increased. Additionally, in the case of the second embodiment, since facilities of ultraviolet irradiation which adversely influences a human body are necessary, and moreover, it is necessary to irradiate the whole surface of a resin layer with an ultraviolet ray, photocuring becomes insufficient when there is an opaque portion in a substrate.

Patent Document 4 describes a pressure sensitive adhesive agent containing a main polymer having a crosslinking functional group, a low molecular weight polymer having a hydrogen-bonding functional group, and an isocyanate-based crosslinking agent, as an acrylic-based pressure sensitive adhesive agent used in a touch panel. In Patent Document 4, as the effect, it is described that there is little variation in electrical property of a transparent conductive film, and at the same time, wet heat stability resistance and level difference followability are good, and whitening and expansion are hardly generated, but the agent hardly follows a high level difference, and air bubbles are generated.

DOCUMENTS OF RELATED ART

Patent Documents

Patent Document 1: Japanese Unexamined Patent Application, First Publication No. 2012-035431
Patent Document 2: Japanese Unexamined Patent Application, First Publication No. 2013-166846
Patent Document 3: Japanese Unexamined Patent Application, First Publication No. 2014-026337
Patent Document 4: Japanese Unexamined Patent Application, First Publication No. 2013-001769

SUMMARY OF THE INVENTION

Problem to be Solved by the Invention

The present invention was made in view of the above-mentioned circumstances, and an object thereof is to provide an adhesive resin layer, which can prevent generation of air bubbles even when adhered to a substrate having a high level difference, is good in durability without generating air bubbles even after thermal endurance and after wet thermal endurance, of a laminate obtained by laminating a substrate, an adhesive resin layer, and a substrate in an order, and can maintain transparency, an adhesive resin film, a laminate, and a method of producing a laminate.

Means for Solving the Problem

In order to solve the above-mentioned problems, the present invention provides a monolayered adhesive resin layer including an acrylic-based adhesive resin composition having transparency, wherein the adhesive resin composition contains (A) an acrylic-based polymer, (B) an acrylic-based monomer, and (C) a thermopolymerization initiator, and the adhesive resin layer has pressure sensitive adhesiveness on both surfaces at an ambient temperature, and can be thermally cured by heating at a temperature of 100 to 250° C. and a time of 30 seconds to 10 minutes.

It is preferable that the acrylic-based monomer is a monomer of (meth)acrylate having a hydroxyl group.

It is preferable that the adhesive resin composition contains 4 to 20 parts by weight of the (B) acrylic-based monomer based on 100 parts by weight of the (A) acrylic-based polymer.

It is preferable that the thermopolymerization initiator is a peroxide.

It is preferable that, in the adhesive resin layer, a storage elastic modulus at a temperature of 23° C. after thermal curing by heating is higher than a storage elastic modulus at a temperature of 23° C. before the heating, a storage elastic modulus at a temperature of 23° C. before heating is $1\times10^4$ to $1\times10^6$ Pa, and a storage elastic modulus at a temperature of 23° C. after thermal curing by the heating is $1\times10^4$ to $1\times10^9$ Pa.

Also, the present invention provides an adhesive resin film including the adhesive resin layer laminated between two separators.

Also, the present invention provides a laminate including two substrates laminated with the adhesive resin layer interposed between the two substrates.

Also, the present invention provides a method of producing a laminate comprising laminating two substrates with the adhesive resin layer interposed between the two substrates, and thermally curing the adhesive resin layer in a state where the resulting laminate is held between two dies.

When a boiling point of a solvent contained in a raw material composition of the adhesive resin layer is expressed as "Temperature A", a temperature at which the thermopolymerization initiator has a half-life of 1 minute is expressed as "Temperature B", a temperature at heating for removing the solvent in the step of producing the adhesive resin layer is expressed as "Temperature C", and a pressing temperature of a die in the step of thermally curing the adhesive resin layer is expressed as "Temperature D", it is preferable that each temperature is in an order of an equation (1) below:

Temperature A<Temperature C<Temperature B<Temperature D.         Equation (1)

At least one substrate of the two substrates can include one or more level differences of 5 μm to 1 mm in a surface on a side contacting with the adhesive resin layer.

The level difference is preferably 50 μm to 1 mm.

It is preferable that a thickness of the adhesive resin layer of the present invention is larger than the level difference. The thickness of the adhesive resin layer of the present invention is preferably 55 μm to 3 mm which is 1.1 to 3 times of the level difference, and further preferably 60 μm to 2 mm which is 1.2 to 2 times of a thickness of the level difference.

It is preferable that a temperature of the die upon the thermal curing is a temperature of 150 to 300° C.

The present invention is characterized in that it includes an acrylic-based polymer, an acrylic-based monomer, and a thermopolymerization initiator, and a transfer tape-like adhesive resin layer can be prepared from the above-mentioned components. The adhesive resin layer has substrate followability to a substrate having a level difference due to the monomer components. The monomer components are cured by the reaction initiation condition such as heat, and an adhesive resin layer in which air bubbles are not generated even when there is a level difference, and a method of producing it can be provided. Particularly, by contrivance of an addition amount of the acrylic-based monomer, followability to a substrate, and the strength of the transfer tape-like adhesive resin layer itself can be retained. According to the present invention, it has become possible that the adhesive resin layer is almost forced to follow a substrate forcibly, particularly by heat pressing. At producing of a laminate, not curing by electron beam irradiation or energy ray irradiation through the air, but thermal pressing in which both heat and pressure are applied to the laminate not through the air is preferable from the viewpoint of suppression of air bubble generation, and durability.

Effects of Invention

According to the present invention, there can be provided an adhesive resin layer, which can prevent generation of air bubbles even when adhered to a substrate having a high level difference, and can maintain transparency, an adhesive resin film, a laminate, and a method of producing a laminate.

BEST MODE FOR CARRYING OUT THE INVENTION

Figure 1:
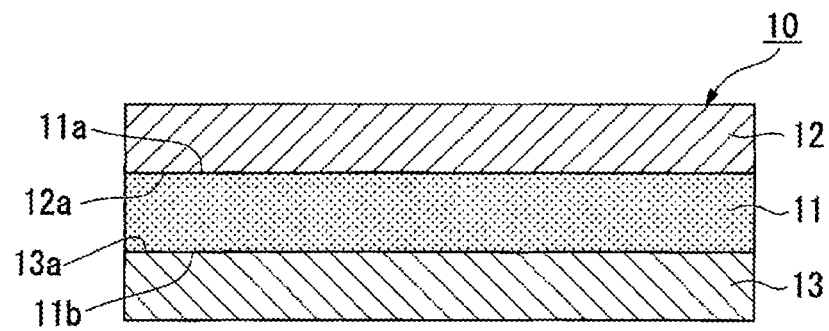
FIG. 1 is a cross-sectional view showing one example of the adhesive resin film of the present invention.

Referring to the drawings, the present invention will be illustrated below based on preferable embodiments.

FIG. 1 shows a cross-sectional view of one example of an adhesive resin film 10. The adhesive resin film 10 has two separators 12, 13, and an adhesive resin layer 11 which is laminated between them. An adhesive resin composition constituting the adhesive resin layer 11 contains (A) an acrylic-based polymer, (B) an acrylic-based monomer, and (C) a thermopolymerization initiator. Both surfaces 11a, 11b of the adhesive resin layer 11 have pressure sensitive adhesiveness at an ambient temperature (are pressure sensitive adhesive surfaces).

In addition, in the present specification, an "ambient temperature" is about 3° C. to about 40° C., preferably about 10° C. to about 30° C., more preferably about 15° C. to about 25° C., and most preferably about 23° C.

The adhesive resin layer 11 includes the adhesive resin composition over the entirety in a thickness direction. The adhesive resin layer 11 may be composed of two or more layers including the same kind or different kinds of adhesive resin compositions, as far as the layer includes the adhesive resin composition satisfying the requirement. When the adhesive resin layer 11 contains a monolayered adhesive resin layer, since a layer configuration can be simplified to reduce the cost, it is preferable. The adhesive resin composition includes an acrylic-based adhesive resin (polymer), and has transparency.

Separators 12, 13 have releasability on surfaces 12a, 13a on a side contacting with the adhesive resin layer 11 (are release surfaces). Examples of a configuration of separators 12, 13 include a configuration that a release layer is provided on one side or both sides of a resin film, and a configuration that a release agent is contained in a resin of a resin film. In place of the resin film, a paper, a synthetic paper, a metal foil, various sheets or the like may be used. When separators 12, 13 have transparency, since optical test of the adhesive resin layer 11 can be performed using the adhesive resin film 10 from which separators 12, 13 have not been released, as it is, this is preferable.

Figure 2:
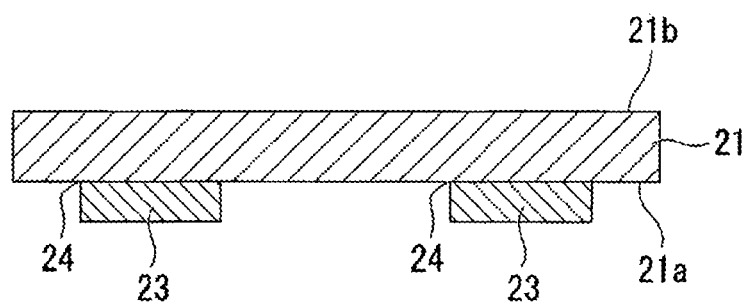
FIG. 2 is a cross-sectional view showing one example of a substrate having a level difference.
Figure 3:
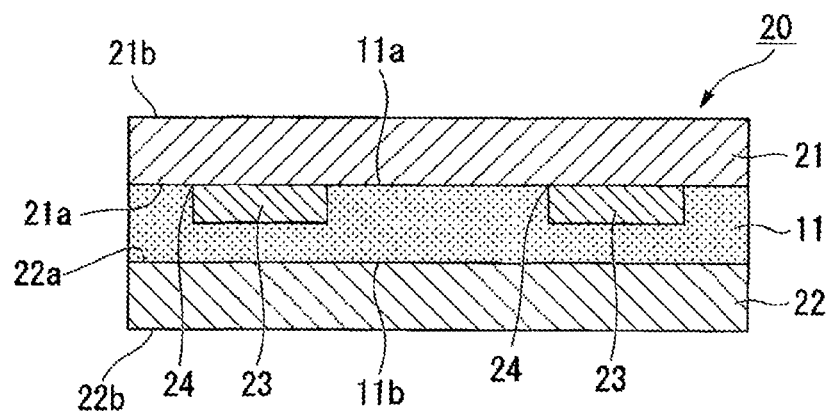
FIG. 3 is a cross-sectional view showing one example of a laminate in which an adhesive resin layer is laminated between two substrates.

Two substrates can be adhered to the adhesive resin film 10 shown in FIG. 1 with pressure sensitive adhesive surfaces 11a, 11b which are exposed by releasing separators 12, 13 from the adhesive resin layer 11. FIG. 3 shows one example of a laminate 20 in which the adhesive resin layer 11 is laminated between two substrates 21, 22. At least one of two substrates 21, 22 (herein, substrate 21) has a level difference due to a convex portion 23, as shown in FIG. 2. The level difference due to the convex portion 23 may exist on one of, or on both of surfaces 21a, 22a on a side where two substrates 21, 22 are contacted with the adhesive resin layer 11.

In FIG. 2, the convex portion 23 is shown separately from the substrate 21, but the convex portion 23 may be integrated with the substrate 21. For example, when irregularities are formed on a surface of a substrate, a portion from a bottom of a concave portion to a top of a convex portion (height difference) becomes a level difference. Level differences provided on surfaces 21a, 22a on a side contacting with the adhesive resin layer 11 may be small and large mixed ones, and may contain a level difference of 5 μm to 1 mm and preferably 50 μm to 1 mm.

Substrates 21, 22 are an adherend which is adhered with the adhesive resin layer 11. Respective substrates 21, 22 may be a rigid plate or may have flexibility like a film. For example, the substrates may be a single plate of a glass, polycarbonate, an acryl, various resins, a ceramic, a metal or the like, or may be a composite composed of a plurality of materials, such as a liquid crystal panel, a touch panel, a cover glass, and a wiring substrate. Outer surfaces 21b, 22b of substrates 21, 22 may be flat, or may have irregularities.

When a laminate 20 as shown in FIG. 3 is formed, an order of releasing separators 12, 13 is not particularly limited. After one substrate is adhered to one pressure sensitive adhesive surface which is exposed by releasing one separator, the other substrate may be adhered to the other pressure sensitive adhesive surface which is exposed by releasing the other separator. After both separators are released to expose both pressure sensitive adhesive surfaces, substrates may be adhered, respectively.

Since the adhesive resin layer 11 contains the (B) acrylic-based monomer having flowability, it has high softness, and up to a corner portion 24 of a level difference of the convex portion 23 can be wetted with the adhesive resin composition. For this reason, even when the level difference is large, air bubbles can be suppressed. Since the adhesive resin layer 11 contains the (C) thermopolymerization initiator, connection can be made to be more firm, by thermally curing the layer after adhering. When compared with ultraviolet light irradiation, there is an advantage that facilities for thermal curing are simple, and even when the substrate contains a portion having low translucency, the layer is securely cured.

Figure 4:
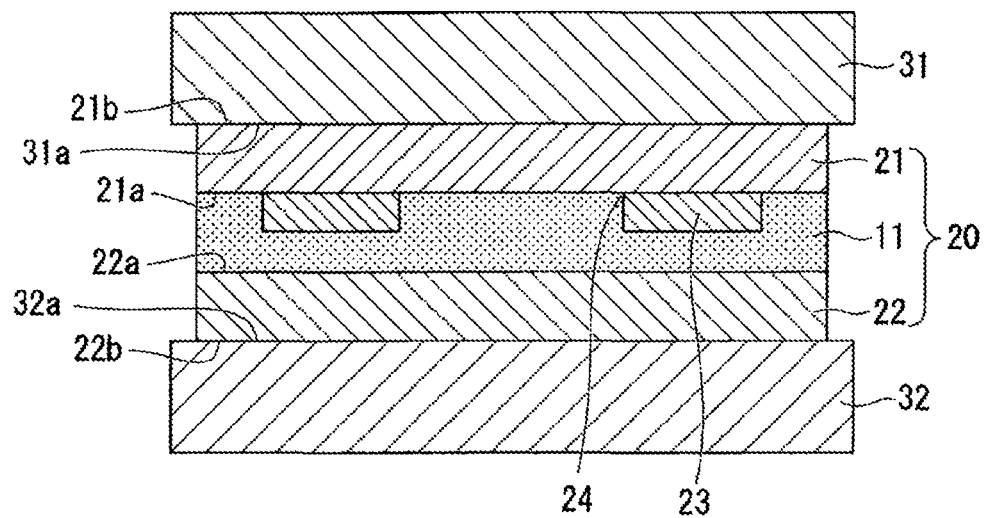
FIG. 4 is a cross-sectional view showing one example of the state where the laminate of FIG. 3 is held between dies.

By heating the laminate 20 obtained by laminating two substrates 21, 22 with the adhesive resin layer 11 interposed therebetween in the state where it is held between two dies 31, 32 as shown in FIG. 4, the adhesive resin layer 11 can be cured. Thereby, a reaction of the (A) acrylic-based polymer and the (B) acrylic-based monomer (polymerization, crosslinking or the like) progresses, and an adhering force between substrates 21, 22 is increased. Additionally, by performing pressurization together with heating, even when air bubbles remain around the level difference, gaps are filled, and air bubbles can be removed. Upon thermal curing, at least one of dies 31, 32 is heated.

When the laminate 20 is thermally pressed, a cushion (buffer sheet), a release sheet, a protective sheet or the like (inclusion) may intervene between dies 31, 32 and the laminate 20 (more particularly, between pressing surfaces 31a, 32a of dies 31, 32, and outer surfaces 21b, 22b of substrates 21, 22). When outer surfaces 21b, 22b of substrates 21, 22 have irregularities, since when a convex portion of outer surfaces is directly contacted with dies 31, 32, the pressure is easily concentrated on the convex portion, it is preferable that the above-mentioned inclusion is provided.

Dies 31, 32 do not cover a side surface of the laminate 20 in FIG. 4, but it may be configured that irregularities are provided on one or both of dies 31, 32, so that a side surface of the laminate 20 is covered with the die(s). For example, when one die is made to be a convex type, and the other die is made to be a concave type, after the laminate 20 is housed in a concave portion of the concave type, a convex portion of the convex type may approach toward the concave portion of the concave type.

Figure 5:
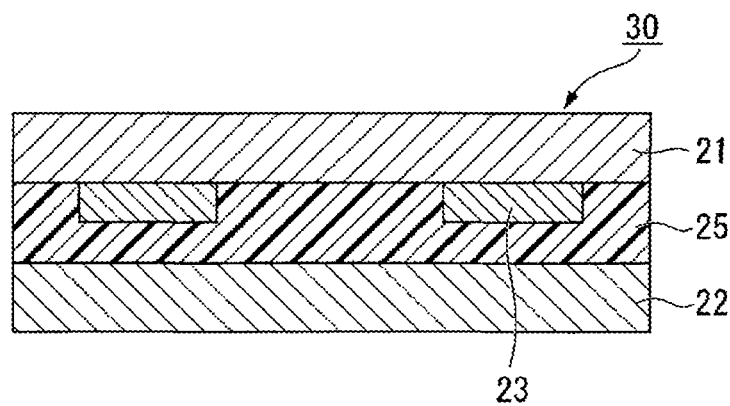
FIG. 5 is a cross-sectional view showing one example of a laminate in which an adhesive resin layer has been thermally cured.

FIG. 5 shows one example of a laminate 30 which is obtained by thermal curing. In this laminate 30, as a result of thermal curing of the adhesive resin layer 11, an adhesive layer 25 containing the thermally cured adhesive resin is laminated between two substrates 21, 22. Since hardness of the adhesive layer 25 after thermal curing has been increased, even when the adhesive resin layer 11 before heating is soft, re-release is difficult. Thereby, as the adhesive resin layer 11, a resin which is excellent in level difference followability in spite of a low adhering force can be used.

Upon producing of the laminate 30, for example, when the substrate 21 has irregularities, and the substrate 22 is flat, several producing methods are contemplated. For producing the laminate 30, any process can be adopted.

As a first laminating method, a method comprising laminating the adhesive resin layer 11 on the substrate 21 having irregularities, thereafter, performing autoclave treatment, laminating the flat substrate 22 on the adhesive resin layer 11, laminating the laminate 20, and thereafter, or while the substrate 22 being laminated, thermally curing the adhesive resin layer 11 using dies 31, 32 can be mentioned.

As a second laminating method, a method comprising laminating the adhesive resin layer 11 on the flat substrate 22, thereafter, performing autoclave treatment, laminating the substrate 21 having irregularities on the adhesive resin layer 11, and thereafter, or while the substrate 21 being laminated, thermally curing the adhesive resin layer 11 using dies 31, 32 can be mentioned.

As a third laminating method, a method comprising laminating the substrate 21 having irregularities, the adhesive resin layer 11, and the flat substrate 22 at the same time, and thereafter, or simultaneously with lamination, thermally curing the adhesive resin layer 11 using dies 31, 32 can be mentioned.

The first laminating method is a method in which since the adhesive resin layer has become easy to follow irregularities by adhering the substrate 21 having irregularities and the adhesive resin layer 11 previously, and performing autoclave treatment, air bubbles can be reduced even when the condition for thermal pressing is greatly fluctuated. Additionally, the third laminating method is a method having greatest merits in the cost, in a point that a producing process can be shortened.

In FIG. 2 to FIG. 5, the level difference of substrate 21, 22 has been provided in advance on the substrates before thermal pressing, but it is also possible to deform one or both of substrates 21, 22 to generate the level difference, when the adhesive resin layer 11 is laminated between substrate 21, 22 to perform thermal pressing. For example, when irregularities are provided on pressing surfaces 31a, 32a of dies 31, 32, substrates 21, 22 having flexibility such as a resin film can be deformed. By possession of flowability by the initial adhesive resin layer 11, it can follow the level difference of substrates 21, 22. Additionally, during thermal pressing, by progression of thermopolymerization, the adhesive resin layer 11 can be cured to suppress generation of gaps and air bubbles. Further, by connection of substrates 21, 22 with the adhesive layer 25, deformation of the substrates can be fixed to realize molding of irregularities. When a convex portion is formed on an internal surface of the substrate, a concave portion may be formed on an outer surface on a back side.

In order to improve handleability of the adhesive resin layer 11, it is preferable that the adhesive resin layer 11 is thermally cured by heating at a temperature of 100 to 250° C. and a time of 30 seconds to 10 minutes. It is preferable that the layer is thermally cured under the condition of at least a part of these temperature and time ranges, and it is more preferable that the layer is thermally curable in the whole ranges. The thermal curing condition at practical use may be outside the above-mentioned ranges. However, from the viewpoint of preservability, it is preferable that thermal curing does not substantially progress at an ambient temperature, and it is preferable that the layer has a nature that it is not thermally cured by heating, for example, within 10 minutes at a temperature of 100° C. or lower.

In the state where the adhesive resin layer 11 is uncured (before heating), it is preferable that a storage elastic modulus at a temperature of 23° C. is $1 \times 10^4$ to $1 \times 10^6$ Pa. Additionally, after the adhesive resin layer 11 has been thermally cured by heating, it is preferable that a storage elastic modulus at a temperature of 23° C. is $1 \times 10^4$ to $1 \times 10^9$ Pa. It is preferable that a storage elastic modulus at a temperature of 23° C. after thermal curing by heating is higher than a storage elastic modulus at a temperature of 23° C. before heating. These storage elastic moduli can be measured by making the adhesive resin layer in the uncured state (before heating), and the adhesive resin layer after thermal curing by heating (adhesive layer after thermal curing) have a temperature of 23° C., respectively. The vibration frequency when a storage elastic modulus is measured is, for example, 1 Hz. When a storage elastic modulus of the adhesive layer after thermal curing is measured, the adhesive layer after thermal curing can be obtained as a single body by heating and curing the adhesive resin layer between separator films without adhering the adhesive resin layer to the substrate, and thereafter, releasing the separator films.

Then, the adhesive resin layer which is also a transfer tape will be illustrated in further detail.

Since it becomes possible to coat an adhesive raw material composition used in producing the adhesive resin layer of the present invention at a better precision of a thickness when the composition is dissolved in an organic solvent, it is preferable that the composition contains an organic solvent. By drying a solvent from the adhesive raw material composition, an adhesive resin layer is obtained. That is, the constitution of the adhesive raw material composition may be such that the solvent is added to the constitution of the adhesive resin composition constituting the adhesive resin layer. The adhesive resin layer can function as a pressure sensitive adhesive layer at an ambient temperature (before thermal curing).

Examples of a monomer constituting the (A) acrylic-based polymer include an acrylic-based monomer having an ester group (—COO—), an acrylic-based monomer having a carboxyl group (—COOH), an acrylic-based monomer having an amido group (—CONR$_2$ wherein R is a substituent such as a hydrogen atom or an alkyl group), an acrylic-based monomer having a nitrile group (—CN), and a non-acrylic-based monomer such as olefins, styrene, vinyl esters, vinyl ethers, and vinylsilane. As the (A) acrylic-based polymer, a copolymer composed of two or more monomers is preferable. A number average molecular weight of the (A) acrylic-based polymer before photopolymerization is preferably, for example, about 50,000 to 100,000. Examples of the viscosity include about 1,000 to 10,000 mPa·s.

Examples of the acrylic-based monomer having an ester group (—COO—) include alkyl (meth)acrylate, (meth)acrylate having a hydroxyl group (hydroxy group), (meth)acrylate having an alkoxy group or a polyether group, (meth)acrylate having an amino group or a substituted amino group, and the like. In addition, in the present specification, (meth)acrylate is a generic name of acrylate and methacrylate.

Examples of the acrylic-based monomer having a carboxyl group (—COOH) include acrylic acid, methacrylic acid, (meth)acrylate having a carboxyl group (—COOH), and the like.

Examples of the acrylic-based monomer having an amido group (—CONR$_2$ wherein R is a substituent such as a hydrogen atom or an alkyl group) include acrylamide, methacrylamide, and the like.

Examples of the acrylic-based monomer having a nitrile group (—CN) include acrylonitrile, methacrylonitrile, and the like.

It is preferable that in the (A) acrylic-based polymer, 50% by weight or more of a constituent monomer is composed of an acryl-based monomer. Particularly, it is preferable that 50% by weight or more of the constituent monomer is composed of one or two or more of alkyl (meth)acrylates represented by the general formula $CH_2=CR^1—COOR^2$ (wherein $R^1$ represents hydrogen or a methyl group, and $R^2$ represents an alkyl group having 1 to 14 carbon atoms). Specific examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, n-hexyl (meth)acrylate, 2-ethylhexyl (meth)acrylate, n-octyl (meth)acrylate, isooctyl (meth)acrylate, sononyl (meth)acrylate, decyl (meth)acrylate, and dodecyl (meth)acrylate. Particularly, it is preferable to essentially use alkyl (meth)acrylate in which the carbon number of an alkyl group $R^2$ is 4 to 12 (for example, 50 to 100 mole %).

Additionally, examples of the (meth)acrylate containing a hydroxyl group include one or two or more of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctane (meth)acrylate, polyethylene glycol mono(meth)acrylate, polypropylene glycol mono(meth)acrylate, cyclohexanedimethanol mono(meth)acrylate, and the like.

Examples of the (B) acrylic-based monomer include the same monomers as monomers constituting the (A) acrylic-based polymer. However, the same monomers as one or two or more of monomers constituting the (A) acrylic-based polymer are not necessarily used as one or two or more of the (B) acrylic-based monomers, and may be mutually different monomers.

The (B) acrylic-based monomer is not particularly limited, as far as it becomes a part of a polymer by thermal curing with the (C) thermopolymerization initiator, and is a liquid (fluid) having a viscosity lower than that of the polymer. As the (B) acrylic-based monomer, acrylate oligomers such as urethane acrylate oligomer and epoxy acrylate oligomer can also be used. The number of polymerizable functional groups possessed by the (B) acrylic-based monomer is, for example, 1 to 5.

When as a part or all of the (B) acrylic-based monomer, a monomer of (meth)acrylate having a hydroxyl group is contained, the hydroxyl group having polarity becomes easy to be dispersed in the whole adhesive resin layer. Thereby, since the moisture is hardly condensed, and cloudiness of the adhesive resin layer is suppressed even under the environment having high humidity (further, high temperature), the above is preferable.

Examples of the (C) thermopolymerization initiator include a radical initiator which is degraded by heat to initiate polymerization of a monomer (radical polymerization) and curing of a resin. As the radical initiator, a redox initiator, an organometallic compound, and the like, which act at a low temperature, are also known, but from a point of handleability of the adhesive resin layer, an (organic) peroxide system, an azo system and the like, which act at a higher temperature, are preferable. Since the thermopolymerization initiator is not reacted or halved during producing of a transfer tape, particularly, in a step of drying a solvent, it is preferable that a temperature at which a half-life of the thermopolymerization initiator becomes 1 minute (hereinafter, this may be referred to as "1-minute half-life temperature") is higher than a boiling point of an organic solvent contained by the adhesive raw material composition. Additionally, it is preferable that the thermopolymerization initiator is a material having a 1-minute half-life temperature which is lower than a thermal pressing set temperature by 50° C. or more, to sufficiently react at a temperature at thermal pressing for a fixed period of time.

Specific examples of the (organic) peroxide-based thermopolymerization initiator include benzoyl peroxide, acetyl peroxide, decanoyl peroxide, lauroyl peroxide, dicumyl peroxide, di-t-butyl peroxide, t-butyl peroxybenzoate, t-butyl peroxy-2-ethylhexanoate, cumene hydroperoxide, t-butyl hydroperoxide, and the like.

Examples of the azo-based thermopolymerization initiator include 2,2'-azobis(isobutyronitrile), 2,2'-azobis(2-methylbutyronitrile), 2,2'-azobis(2,4-dimethylvaleronitrile), 2,2'-azobis(4-cyanovaleronitrile), 2,2'-azobis(4-methoxy-2,4-dimethylvaleronitrile), 2,2'-azobis(methylisobutyrate), 1,1'-azobis(1-cyclohexanecarbonitrile), and the like.

A polymerization retarder can be added to the adhesive resin layer in the present invention. By use of the polymerization retarder, it becomes easy to control a polymerization degree. Additionally, use of the polymerization retarder is preferable from the viewpoint that level difference followability is improved.

It is preferable that the adhesive resin composition contains 4 to 20 parts by weight of the (B) acrylic-based monomer and 0.001 to 5 parts by weight of the (C) thermopolymerization initiator, based on 100 parts by weight of the (A) acrylic-based polymer.

The adhesive resin composition can further contain arbitrary components other than (A) to (C). For example, (D) a crosslinking agent (curing agent) such as an isocyanate-based crosslinking agent, an epoxy-based crosslinking agent, and a metal chelate compound are suitably used to crosslink the (A) acrylic-based polymer, or a polymer which is produced by polymerization of the (B) acrylic-based monomer. In this case, as necessary, a polymer or a monomer having a functional group reacting with the (D) crosslinking agent is used, as at least a part of the (A) acrylic-based polymer or the (B) acrylic-based monomer. The functional group reacting with the (D) crosslinking agent is a hydroxyl group, a carboxyl group or the like, for example, in the case of the isocyanate-based crosslinking agent. An addition amount of the (D) crosslinking agent is preferably, for example, 1.5 equivalents or less relative to the functional group of the polymer. Examples of other arbitrary components include, for example, an antioxidant, a filler, a plasticizer, and the like. The adhesive raw material composition used in producing the adhesive resin layer may contain water or a solvent such as an organic solvent, or may be a solvent-free syrup-like composition. When a material which is potentially corroded, such as an oxide electrically conductive film such as ITO or a base metal exists on a substrate, and the adhesive resin layer is contacted with this, it is preferable to reduce a corrosive component such as an acid, for example, use a polymer having a low acid value, as a material of the adhesive resin composition.

(Method of Producing Adhesive Resin Layer)

The adhesive resin layer (transfer tape) in the present invention can be produced by applying the adhesive raw material composition on a separator film in the state where it contains a solvent, drying and, further, protecting this with a separator film. It is preferable that the adhesive raw material composition is applied using a die or a pipe doctor. In drying the solvent, drying with a drier or the like is preferable. Regarding a time for drying the solvent, in view of productivity, 10 minutes or shorter is preferable, and 2 to 5 minutes is further preferable. Additionally, since it is necessary to sufficiently dry the organic solvent, it is preferable to perform drying at a temperature not lower than a boiling point of the organic solvent, and it is preferable to perform drying at not higher than a 1-minute half-life temperature of the thermopolymerization initiator.

As described above, the present invention has been illustrated based on preferable embodiments, but the present invention is not limited to the above-mentioned embodiments, and can be variously modified in a range not departing from the gist of the present invention.

The laminate may have the adhesive resin layer between 3 or more substrates, respectively. It is preferable that one or more (preferably, all) of two or more adhesive resin layers contained in the laminate is (are) adhesive resin layer(s) of the present embodiment.

When the laminate is thermally pressed, two or more laminates may be arranged between a pair of dies. This arrangement is not particularly limited, but two or more laminates may be stacked in a direction of pressurization with the dies, or two or more laminates may be aligned in a plane vertical to a pressurization direction (for example, on a pressing surface of any die). The above-mentioned inclusion may intervene between two or more laminates.

In the present invention, after producing of the adhesive resin layer 11 as shown in FIG. 1, a laminate structure as shown in FIG. 3 is prepared, and the laminate 30 as shown in FIG. 5 is prepared via thermal treatment with a configuration as shown in FIG. 4, and it is preferable that a step of removing the solvent by heating from the adhesive raw material composition containing the solvent is provided, at the time of producing of the adhesive resin layer 11 of FIG. 1. Additionally, in the process condition after later adhering, it is necessary to heat the adhesive resin layer 11 to initiate polymerization.

(Pressing Condition)

In order to apply heat so that a temperature for heating the laminate becomes 100 to 250° C. at the time of pressing in the present invention, it is necessary to heat the die at a temperature higher than a desired heating temperature. A temperature of the die is preferably 100 to 300° C., and further preferably 150 to 300° C. In the case where the substrate or a part of the substrate contains polyethylene terephthalate, and when the polyethylene terephthalate is heated, for example, at 180° C. for about 10 minutes, oligomer components are precipitated, and the precipitated components cause appearance defect, it is preferable that a heating temperature at thermal pressing is 180° C. or lower.

When the substrate does not contain polyethylene terephthalate, and a material which does not cause precipitation of oligomer components is used, a heating temperature may be 100 to 300° C. Regarding a pressing time in the present invention, from the viewpoint of productivity, it is preferable that a reaction is completed within 2 minutes. Additionally, regarding a pressing temperature and time, they can be set so that the strength of the laminate becomes sufficient.

EXAMPLES

The present invention will be specifically illustrated below by way of examples.

Example 1

Using SK Dyne (registered trademark) 2094 (Soken Chemical & Engineering Co., Ltd., acid value: 33, number average molecular weight 70,000) as the (A) acrylic-based polymer, and E-AX (Soken Chemical & Engineering Co., Ltd.) as the crosslinking agent, the crosslinking agent was blended at the ratio of 0.05 parts by weight based on 100 parts by weight of the polymer solid content. To the resulting mixture were added 10 parts by weight of 4-hydroxybutyl acrylate (Osaka Organic Chemical Industry Ltd.; 4HBA) as the (B) acrylic-based monomer, and 0.02 parts by weight of t-butyl peroxy-2-ethylhexanoate (manufactured by NOF Corporation; product name: Perbutyl (registered trademark) O) as the (C) thermopolymerization initiator, to prepare an adhesive raw material composition. The adhesive raw material composition contains ethyl acetate (boiling point 77° C.) as a solvent.

After the adhesive raw material composition was applied on an upper surface of a separator (manufactured by Fujimori Kogyo Co., Ltd.; product name: 125E-0010DG2.5AS, thickness 125 μm) using an applicator so that a thickness of the adhesive resin layer (pressure sensitive adhesive layer) after drying became 175 μm, the solvent was dried in a drying step under the condition of 90° C. and 2 minutes, to prepare a laminate in which the adhesive resin layer is laminated.

Then, a separator (manufactured by Fujimori Kogyo Co., Ltd; product name; 38E-0010BDAS, thickness 38 μm) was adhered on an upper surface of the adhesive resin layer of the resulting laminate, to prepare an adhesive resin film of Example 1.

Regarding Examples 1 to 9 and Comparative Examples 1 to 3, a laminate containing a separator film and a substrate was produced, under the constitution of the adhesive raw material composition and the producing condition described in Table 1.

TABLE 1

| | Constitution of adhesive raw material composition | | | | | Thickness of adhesive resin layer/ μm |
|---|---|---|---|---|---|---|
| | Acrylic-based polymer/ part by weight | Crosslinking agent/ equivalent | Acrylic-based monomer/ part by weight | Reaction initiator/ part by weight | Process condition after adhering | |
| Example 1 | SK Dyne 2094/ 100 | E-AX/ 0.05 | 4HBA/ 10 | Perbutyl O/ 0.02 | After adhering, thermal pressing 150° C. 2 minutes | 175 |
| Example 2 | Polymer of 2EHA and AA (90:10) Mn = 70,000, Mw = 1,260,000/ 100 | E-AX/ 0.05 | 4HBA/ 10 | Perbutyl O/ 0.02 | After adhering, thermal pressing 150° C. 2 minutes | 175 |
| Example 3 | SK Dyne 2147/ 100 | E-AX/ 0.05 | 4HBA/ 10 | Perbutyl O/ 0.02 | After adhering, thermal pressing 150° C. 2 minutes | 175 |
| Comparative Example 1 | SK Dyne 2094/ 100 | E-AX/ 0.05 | 4HBA/ 10 | Irg651/ 0.1 | After adhering, thermal pressing 150° C. 2 minutes | 175 |
| Comparative Example 2 | SK Dyne 2094/ 100 | E-AX/ 0.05 | 4HBA/ 10 | — | After adhering, thermal pressing 150° C. 2 minutes | 175 |
| Comparative Example 3 | SK Dyne 2094/ 100 | E-AX/ 0.05 | — | Perbutyl O/ 0.02 | After adhering, thermal pressing 150° C. 2 minutes | 175 |
| Example 4 | SK Dyne 2094/ 100 | E-AX/ 0.05 | 4HBA/ 2 | Perbutyl O/ 0.02 | After adhering, thermal pressing 150° C. 2 minutes | 175 |
| Example 5 | SK Dyne 2094/ 100 | E-AX/ 0.05 | 4HBA/ 4 | Perbutyl O/ 0.02 | After adhering, thermal pressing 150° C. 2 minutes | 175 |
| Example 6 | SK Dyne 2094/ 100 | E-AX/ 0.05 | 4HBA/ 20 | Perbutyl O/ 0.02 | After adhering, thermal pressing 150° C. 2 minutes | 175 |
| Example 7 | SK Dyne 2094/ 100 | E-AX/ 0.05 | 4HBA/ 30 | Perbutyl O/ 0.02 | After adhering, thermal pressing 150° C. 2 minutes | 175 |
| Example 8 | SK Dyne 2094/ 100 | E-AX/ 0.05 | 4HBA/ 10 | Perbutyl O/ 0.02 | After adhering, thermal pressing 150° C. 2 minutes | 110 |
| Example 9 | SK Dyne 2094/ 100 | E-AX/ 0.05 | 4HBA/ 10 | Perbutyl O/ 0.02 | After adhering, thermal pressing 150° C. 2 minutes | 300 |

TABLE 1-continued

| | Constitution of adhesive raw material composition | | | | | Thickness of adhesive resin layer/ μm |
|---|---|---|---|---|---|---|
| | Acrylic-based polymer/ part by weight | Crosslinking agent/ equivalent | Acrylic-based monomer/ part by weight | Reaction initiator/ part by weight | Process condition after adhering | |
| Reference Example 1 | Polymer of 2EHA and AA (90:10) Mn = 70,000, Mw = 1,260,000/ 100 | E-AX/ 0.05 | 4HBA/ 15 | Irg651/ 0.1 | After adhering, treatment in autoclave, and UV irradiation | 175 |
| Reference Example 2 | Polymer of 2EHA and AA (90:10) Mn = 70,000, Mw = 1,260,000/ 100 | E-AX/ 0.05 | 4HBA/ 25 | Irg651/ 0.1 | After adhering, treatment in autoclave, and UV irradiation | 175 |

In addition, in Table 1, "SK Dyne 2094" and "SK Dyne 2147" represent SK Dyne (registered trademark) 2094 and SK Dyne (registered trademark) 2147, respectively. "4HBA" represents 4-hydroxybutyl acrylate. "Perbutyl O" is a thermopolymerization initiator containing t-butyl peroxy-2-ethylhexanoate as an active component. "Irg651" is a photopolymerization initiator containing 2,2-dimethoxy-2-phenylacetophenone (another name benzyl dimethyl ketal) as an active component. "Perbutyl H" (see Table 3) is a thermopolymerization initiator containing t-butyl hydroperoxide as an active component.

(Test Results)

(Method of Confirming and Evalulating Appearance after Thermal Pressing)

As substrates, a flat polyethylene terephthalate (PET) film was prepared as one substrate, and a polyethylene terephthalate (PET) film on which 20 μm, 50 μm, and 100 μm printing level differences are formed on a surface was prepared as another substrate. As dies, dies each having a smooth surface so that an outer surface of a substrate after pressing (outer surfaces of a laminate) becomes smooth, were used. A separator on one side was released from an adhesive resin film in advance, the film was adhered to a PET film on which a printing level difference had been formed, the adhered films and a smooth PET film on which a printing level difference had not been formed were held between dies with a thermal pressing machine, and thermal pressing was performed under the thermal pressing condition shown in "process condition after adhering" of Table 1. Appearance of the laminate after adhering (adhered product) was visually confirmed immediately after thermal pressing, and evaluated as follows.

○: Air bubbles cannot be confirmed between substrates or at a printing level difference portion.

Δ: Air bubbles can be confirmed extremely slightly between substrates or at a printing level difference portion.

×: Air bubbles can be confirmed between substrates or at a printing level difference portion.

Easiness of adhering was evaluated as follows. A separator on one side of the adhesive resin film was released, presence of firm feeling when adhered to a predetermined position of a PET film on which a printing level difference had been formed and easy positioning, and appearance of a laminate after adhering (particularly, caught air bubble) were confirmed visually. For adhering, a adhering device (product name SE320) manufactured by Climb Products Co., Ltd. was used.

○: Air bubbles remain around a corner of a printing level difference (because they disappear by thermal pressing).

Δ: Air bubbles remain at the periphery of a printing level difference (because they disappear by thermal pressing).

×: Air bubbles 1 mm or more from a printing level difference remain (because they do not disappear by thermal pressing).

Concerning the adhesive resin layer when a coated product having a coating width of 400 mm which had been wound up with the tension of 40 N was unreeled again, thickness retention was evaluated as follows.

○: There was no crease and appearance is good.

Δ: There is crease, but floating of a separator is not seen.

×: There is crease, a separator is floated, and a thickness of the adhesive resin layer has been changed.

Regarding suitability for cutting, a pinnacle blade which can perform punching into a square shape at a blade angle of 30 degrees was mounted in a cutting device, and press working and stripping of peripheral unnecessary portions were performed. Evaluation was performed as follows.

⊚: Stripping of peripheral unnecessary portions was easy.

○: Stripping of peripheral unnecessary portions was possible.

Δ: Stripping of peripheral unnecessary portions was difficult.

×: A cut portion was re-attached, and stripping could not be easily performed.

(Method of Testing Durability of Adhered Product)

Regarding a durability test, a laminate after thermal pressing (adhered product) was placed into the high-temperature dry environment of 85° C./dry, or the high-temperature high-humidity environment of 85° C./85% RH, and taken out after a predetermined time passed, visual confirmation was performed, and evaluation was conducted as follows. ○: There is no floating and no peeling in a adhered product. Δ: There is small floating and peeling in a adhered product. ×: There is large floating and peeling in a adhered product.

Results of the above-mentioned evaluation tests are shown in the following Table 2.

TABLE 2

|  | Easiness of adhering | Thickness retention | Suitability for cutting | Air bubbles when used in substrate of level difference 20 μm | Air bubbles when used in substrate of level difference 50 μm | Air bubbles when used in substrate of level difference 100 μm | Durability test of adhered product of level difference 100 μm 85° C./dry | Durability test of adhered product of level difference 100 μm 85° C./85% RH |
|---|---|---|---|---|---|---|---|---|
| Example 1 | ○ | ○ | ○ | ○ | ○ | ○ | ○ | ○ |
| Example 2 | ○ | ○ | ○ | ○ | ○ | ○ | ○ | ○ |
| Example 3 | ○ | ○ | ○ | ○ | ○ | ○ | ○ | ○ |
| Comparative Example 1 | ○ | ○ | ○ | ○ | ○ | ○ | X | X |
| Comparative Example 2 | ○ | ○ | ○ | ○ | ○ | ○ | X | X |
| Comparative Example 3 | Δ | ○ | ○ | X | X | X | X | X |
| Example 4 | Δ | ○ | ○ | Δ | Δ | Δ | Δ | Δ |
| Example 5 | ○ | ○ | ○ | ○ | ○ | ○ | ○ | ○ |
| Example 6 | ○ | ○ | ○ | ○ | ○ | ○ | ○ | ○ |
| Example 7 | ○ | Δ | Δ | ○ | ○ | ○ | Δ | Δ |
| Example 8 | Δ | ○ | ⊙ | ○ | Δ | Δ | ○ | ○ |
| Example 9 | ○ | Δ | Δ | ○ | ○ | ○ | ○ | ○ |
| Reference Example 1 | ○ | ○ | ○ | ○ | Δ | X | X | X |
| Reference Example 2 | ○ | Δ | X | ○ | ○ | X | X | X |

Reference Examples 1 and 2 are examples in which the adhesive raw material composition containing the photopolymerization initiator was used. As substrates, a flat polyethylene terephthalate (PET) film was prepared as one substrate, and a polyethylene terephthalate (PET) film on which 20 μm, 50 μm, and 100 μm printing level differences had been formed on a substrate was prepared as another substrate. A separator on one side was released from the adhesive resin film, the film was adhered on the PET film on which printing level differences had been formed, a separator remaining in the two-layered adhered product was released, a smooth PET film was adhered to prepare a three-layered adhered product of PET/adhesive resin/PET, and appearance of a laminate immediately after autoclave treatment was visually confirmed, and evaluated as follows.
○: Air bubbles cannot be confirmed between substrates or at a printing level difference portion.
Δ: Air bubbles can be confirmed extremely slightly between substrates or at a printing level difference portion.
×: Air bubbles can be confirmed between substrates or at a printing level difference portion.

When autoclave treatment is performed, there is level difference followability to a substrate having a large level difference, and when a level difference deformation amount is about 20 μm, air bubbles are not generated, and good adhesion can be performed. However, in Reference Example 1, regarding a level difference in which a deformation amount is 50 μm or more, level difference followability is not sufficient, and this is a reference example requiring improvement. Additionally, when an addition amount of a monomer component is increased as in Reference Example 2, level difference followability is improved, and adhering can be performed without entrance of air bubbles into a level difference at a relatively large deformation amount, but this is a reference example in which to a level difference of 100 μm, a problem arose that even after adhering and autoclave treatment, connection is not sufficiently performed, thickness retention is bad, and when a laminate is cut, an adhering component of a connecting portion of the laminate exudes from a cut surface. By irradiating an ultraviolet ray to a adhered product for which air bubbles could not be confirmed, and which could follow a level difference after the above-mentioned adhering, to polymerize a monomer, a product for which expansion cannot be also confirmed in a durability test is obtained, but since in a adhered product which has been applied to a level difference of 100 μm, air bubbles are generated after autoclave treatment, expansion remain as they are even when an ultraviolet ray is irradiated. (Results of Appearance Confirmation and Evaluation after Thermal Pressing)

In examples, even when a deformation amount is 100 μm, air bubbles are not confirmed, and following to deformation of a substrate due to pressing of a die having a printing level difference could be confirmed. It is thought that this is because, as a component having high flowability, in addition to the (A) acrylic-based polymer, the (B) acrylic-based monomer was added to the adhesive raw material composition.

In Comparative Example 3, air bubbles were confirmed. It is thought that this is because in this example, since the adhesive resin layer was formed of the adhesive raw material composition not containing the (B) acrylic-based monomer, following to deformation of the substrate by pressing of a die having a printing level difference is impossible.

In the case of Comparative Examples 1 to 3, durability in the high temperature dry environment and the high temperature high humidity environment was inferior. In Comparative Examples 1 and 2, it is thought that this is because since the adhesive raw material composition containing the acrylic-based monomer, but not containing the thermopolymerization initiator was heated by thermal pressing, polymerization of the acrylic-based monomer hardly progresses. In Comparative Example 3, it is thought that since a adhered product has air bubbles, durability was reduced.

In examples, since the adhesive resin layer is adhered to a substrate which is adhered with PET or the like in the state where flowability is high, the layer can also be firmly attached to fine irregularities. Furthermore, it is thought that since a monomer having high flowability is flown by thermal pressing, the layer follows deformation, thereafter, a thermopolymerization reaction gradually progresses by heat, and a monomer component is polymerized, flowability of the adhesive resin layer is reduced, and the layer is cured in the deformed state, and accordingly, not only air bubbles were not generated at a deformed portion, but also expansion between substrates was not generated.

(Study Regarding Method of Producing Adhered Product)

Using the adhesive raw material composition described in Example 1, study regarding a producing method was performed. As shown in Table 3, in a producing method described in Example 1, a polymerization initiator was changed in Examples 15 and 16, the condition for drying the adhesive resin layer was changed in Examples 10, 11, 12, and 14, and a temperature of the laminate at thermal pressing was changed in Examples 13 and 16. A boiling point of a solvent of the adhesive resin layer is expressed as "Temperature A", a 1-minute half-life temperature of the thermopolymerization initiator is expressed as "Temperature B", a temperature at heating for removing a solvent in a step of producing the adhesive resin layer is expressed as "Temperature C", and a pressing temperature of a die in a step of thermal curing is expressed as "Temperature D".

Example 12 is an example in which since a drying temperature at producing of the adhesive resin layer is the same as a boiling point of a solvent, an organic solvent remains in the adhesive resin layer, drying takes time, and air bubbles due to volatilization of a solvent are also generated extremely slightly at pressing.

In Example 14, it is thought that since a temperature at drying after applying the adhesive raw material composition is high, a polymerization initiator has been deactivated at drying, a reaction does not sufficiently progress at pressing, the acrylic-based monomer is volatilized, and air bubbles are generated extremely slightly. Additionally, it is thought that curing is also insufficient.

In Example 15, it is thought that since a temperature at thermal pressing is lower than a 1-minute half-life temperature of the thermopolymerization initiator, a thermal polymerization reaction does not occur sufficiently, the acrylic-based monomer is volatilized, and curing is also insufficient.

TABLE 3

| | Formulation | | Drying condition after coating of adhesive raw material composition | | Process condition of laminate after adhering | | |
|---|---|---|---|---|---|---|---|
| | | Initiator | | | Thermal | | |
| | Solvent Solvent/boiling point (° C.) Temperature A | Polymerization initiator | 1-Minute half-life temperature (° C.) Temperature B | Drying temperature (° C.) Temperature C | Drying time (min) | pressing temperature (° C.) Temperature D | Thermal pressing time (min) | Order of temperature |
| Example 1 | Ethyl acetate/77 | Perbutyl O | 134 | 90 | 2 | 150 | 2 | A < C < B < D |
| Example 10 | Ethyl acetate/77 | Perbutyl O | 134 | 120 | 1 | 150 | 2 | A < C < B < D |
| Example 11 | Ethyl acetate/77 | Perbutyl O | 134 | 120 | 10 | 150 | 2 | A < C < B < D |
| Example 12 | Ethyl acetate/77 | Perbutyl O | 134 | 77 | 10 | 150 | 2 | A = C < B < D |
| Example 13 | Ethyl acetate/77 | Perbutyl O | 134 | 90 | 2 | 280 | 2 | A < C < B < D |
| Example 14 | Ethyl acetate/77 | Perbutyl O | 134 | 140 | 1 | 150 | 2 | A < B < C < D |
| Example 15 | Ethyl acetate/77 | Perbutyl H | 261 | 90 | 2 | 150 | 2 | A < C < D < B |
| Example 16 | Ethyl acetate/77 | Perbutyl H | 261 | 90 | 2 | 280 | 2 | A < C < B < D |

Results of the above-mentioned evaluation tests are shown in the following Table 4. Regarding productivity, a step of producing the adhesive resin layer by coating and drying of the adhesive raw material composition was determined as follows.

When the adhesive resin film of each example was thermally pressed under the same condition as that of "Method of Confirming and Evaluating Appearance after Thermal Pressing" while the adhesive resin layer was laminated between separators, and thereafter, the cured adhesive

TABLE 4

| | | | Effect | | |
|---|---|---|---|---|---|
| | Pressing time (min) | Order of temperature | Productivity | Easiness of adhering | Air bubbles when used in substrate of level difference 100 μm |
| Example 1 | 2 | A < C < B < D | ○ | ○ | ○ |
| Example 10 | 2 | A < C < B < D | ⊙ | ○ | ○ |
| Example 11 | 2 | A < C < B < D | Δ | ○ | Δ |
| Example 12 | 2 | A = C < B < D | Δ | ○ | Δ |
| Example 13 | 2 | A < C < B < D | ○ | ○ | ○ |
| Example 14 | 2 | A < B < C < D | ⊙ | Δ | Δ |
| Example 15 | 2 | A < C < D < B | ○ | ○ | Δ |
| Example 16 | 2 | A < C < B < D | ○ | ○ | ○ |

⊙: The condition in which a production speed is sufficiently high.
○: The condition in which a production speed is general.
Δ: The condition in which a production speed is slow.

In Example 11, when the drying time is too long under the drying condition after applying the adhesive raw material composition, even if an order of a temperature A, B, C, and D is a preferable order, air bubbles were generated extremely slightly. It is thought that this is because since an amount of a remaining solvent was too small, flowability of the adhesive resin layer was lost.

resin layer was analyzed by FT-IR (Fourier transform infrared spectroscopy), peaks of a carbon-carbon double bond (vinyl group of acrylic-based monomer and the like) could be confirmed little. Furthermore, when analysis was performed by DSC (differential scanning calorimetry) before and after thermal pressing, an exothermic peak was seen in DSC measurement before thermal pressing, but an exothermic peak was not seen in DSC measurement after thermal pressing. From these results, it is thought that a curing reaction was completed under the thermal pressing condition.

In each comparative example, even when thermal pressing was performed, a few peaks which seem to derive from a carbon-carbon double bond were confirmed by FT-IR.

In DSC before thermal pressing, an exothermic peak was not confirmed in Comparative Examples 1 and 2. Since a reaction by heat cannot be confirmed, it can be determined that a thermal curing reaction has not progressed. In Comparative Example 3, since heat generation of a thermal reaction initiator is only confirmed, and there is no reactive monomer which polymerizes, a polymerization reaction does not progress.

From the foregoing results, by inclusion of the (A) acrylic-based polymer, the (B) acrylic-based monomer, and the (C) thermopolymerization initiator as a main component in the adhesive resin layer, a pressure sensitive adhesive film which suppresses air bubbles and release due to thermal press working at a high temperature, and can form a three-dimensional shape can be prepared.

What is claimed is:

1. A monolayered adhesive resin layer comprising an acrylic-based adhesive resin composition having transparency, wherein
said adhesive resin composition consists essentially of (A) an acrylic-based polymer, (B) an acrylic-based monomer, and (C) a thermopolymerization initiator, wherein
said (B) acrylic-based monomer is a monomer of (meth)acrylate having a hydroxyl group which is at least one selected from the group consisting of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctane (meth)acrylate, and cyclohexanedimethanol mon (meth)acrylate,
said adhesive resin composition contains 4 to 10 parts by weight of said (B) acrylic-based monomer based on 100 parts by weight of said (A) acrylic-based polymer, and
said adhesive resin layer has pressure sensitive adhesiveness on both surfaces at an ambient temperature, and can be thermally cured by heating at a temperature of 100 to 250° C. and a time of 30 seconds to 10 minutes.

2. The monolayered adhesive resin layer according to claim 1, wherein said thermopolymerization initiator is a peroxide.

3. The monolayered adhesive resin layer according to claim 1, wherein a storage elastic modulus at a temperature of 23° C. after thermal curing by heating is higher than a storage elastic modulus at a temperature of 23° C. before said heating, a storage elastic modulus at a temperature of 23° C. before heating is $1 \times 10^4$ to $1 \times 10^6$ Pa, and a storage elastic modulus at a temperature of 23° C. after thermal curing by said heating is $1 \times 10^4$ to $1 \times 10^9$ Pa.

4. An adhesive resin film comprising the monolayered adhesive resin layer according to claim 1 laminated between two separators.

5. A laminate comprising two substrates laminated with the monolayered adhesive resin layer according to claim 1 interposed between the two substrates.

6. The laminate according to claim 5, wherein at least one substrate of said two substrates comprises one or more level differences of 5 μm to 1 mm in a surface on a side contacting with said adhesive resin layer.

7. The laminate according to claim 6, wherein said level difference is 50 μm to 1 mm.

8. A method of producing a laminate, comprising:
laminating two substrates with the monolayered adhesive resin layer according to claim 1 interposed between the two substrates; and
thermally curing said adhesive resin layer in a state where the resulting laminate is held between two dies.

9. The method of producing a laminate according to claim 8, wherein when a boiling point of a solvent contained in a raw material composition of said adhesive resin layer is expressed as "Temperature A", a temperature at which said thermopolymerization initiator has a half-life of 1 minute is expressed as "Temperature B", a temperature at heating for removing said solvent in the step of producing said adhesive resin layer is expressed as "Temperature C", and a pressing temperature of a die in the step of thermally curing said adhesive resin layer is expressed as "Temperature D", each temperature is in an order of an equation (1) below:

Temperature A<Temperature C<Temperature B<Temperature D.   Equation (1)

10. The method of producing a laminate according to claim 8, wherein at least one substrate of said two substrates comprises one or more level differences of 5 μm to 1 mm in a surface on a side contacting with said adhesive resin layer.

11. The method of producing a laminate according to claim 10, wherein said level difference is 50 μm to 1 mm.

12. The method of producing a laminate according to claim 8, wherein a temperature of the die upon said thermal curing is a temperature of 150 to 300° C.

* * * * *